United States Patent [19]

Wright et al.

[11] Patent Number: 4,963,649
[45] Date of Patent: Oct. 16, 1990

[54] COPOLYIMIDE AROMATIC SULFONE-FLUOROALIPHATIC RESIN COMPOSITION

[75] Inventors: William E. Wright; David N. Roark, both of Baton Rouge, La.

[73] Assignee: Ethyl Corporation, Richmond, Va.

[21] Appl. No.: 382,216

[22] Filed: Jul. 20, 1989

[51] Int. Cl.$^5$ .......................... C08G 8/02; C08G 69/26
[52] U.S. Cl. ................................... 528/353; 528/125; 528/128
[58] Field of Search .................... 528/353, 125, 128

[56]  References Cited

U.S. PATENT DOCUMENTS

| | | | |
|---|---|---|---|
| 4,094,862 | 6/1978 | Bell | 528/229 |
| 4,241,193 | 12/1980 | Gagliani | 521/77 |
| 4,398,021 | 8/1983 | St. Clair et al. | 528/222 |
| 4,489,027 | 12/1984 | St. Clair et al. | 264/137 |
| 4,588,804 | 5/1986 | Fryd | 528/125 |
| 4,588,805 | 5/1986 | Williams, Jr. | 528/172 |
| 4,696,994 | 9/1987 | Nakajima et al. | 528/176 |
| 4,874,834 | 10/1989 | Higashi et al. | 528/353 |

FOREIGN PATENT DOCUMENTS 2578545 3/1986 France .

*Primary Examiner*—John Kight, III
*Assistant Examiner*—P. Hampton-Hightower
*Attorney, Agent, or Firm*—Richard J. Hammond

[57] ABSTRACT

Copolyimides and their precursors are disclosed comprising units having aromatic sulfone and aromatic fluoroaliphatic groups. These copolymers are represented by the formula

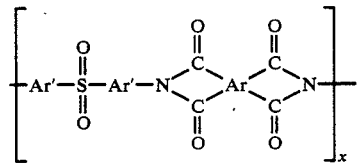

and

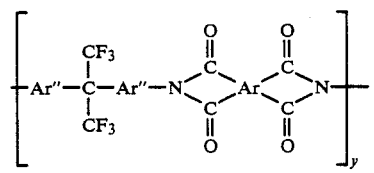

wherein Ar' and Ar" are the same or different and are

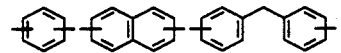

where $Z$ is a chemical bond,

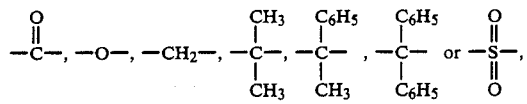

Ar is the tetravalent residue of a tetracarboxylic acid or acid dianhydride or di- or tetraester thereof where the ratio of x to y is from about 1:99 to about 49:51.

These copolymers have improved processing temperatures and can be readily formed into sheets. They may also be used in applications such as hot-melt adhesives or prepregging.

12 Claims, No Drawings

COPOLYIMIDE AROMATIC SULFONE-FLUOROALIPHATIC RESIN COMPOSITION

FIELD OF INVENTION

This invention relates to certain aromatic imide copolymers having low glass transition temperatures. The invention particularly relates to copoly aromatic sulfone imide compositions having improved processability.

BACKGROUND OF THE INVENTION

Polyimides are condensation type polymers having a repeating unit of the type shown in Formula(A), below:

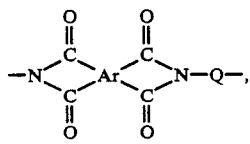
(A)

where Ar is a suitable tetravalent organic (typically aromatic) radical, which may be a simple structure such as that derived from the benzene ring or a more complex structure such as that derived from benzophenone, or any other appropriate, usually aromatic, tetravalent radical; and Q is a divalent organic radical. The polyimide usually is made from the dianhydride of a suitable tetracarboxylic acid in one of two ways, as shown below.

thermally cyclized to polyamide (A). Water and, in the appropriate case, alcohol is given off when (E) or (C) are subjected to high temperature and the polyamide results. In cases where copolymers are desired, as for this invention, the diamine compound includes a second diamine $NH_2Q^1$-$NH_2$, which provides a unit similar to that shown as (C) or (F) except that a further polyamic acid or salt is also formed, i.e.,

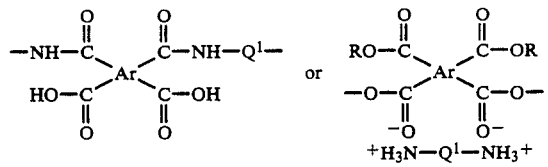

The prior art discloses that many of the totally aromatic polyimides are not easily processed since their crystalline melting points are well above the point where thermal decomposition occurs, i.e., about 450° C. For example, typical infusible polyimides are formed with pyromellitic dianhydride and such varied diamines as m-phenylenediamine or 1,3-bis(4-aminophenoxy)benzene. These materials and related ones are difficult to fabricate on conventional processing equipment because of the high temperatures and pressures necessary to facilitate such operation.

It is known that in a somewhat similar class of polymers, the polyamide-imides, the melt ductility and flow of the polymers are improved by blending in a polyether sulfone, i.e., polymers having the repeating units such as

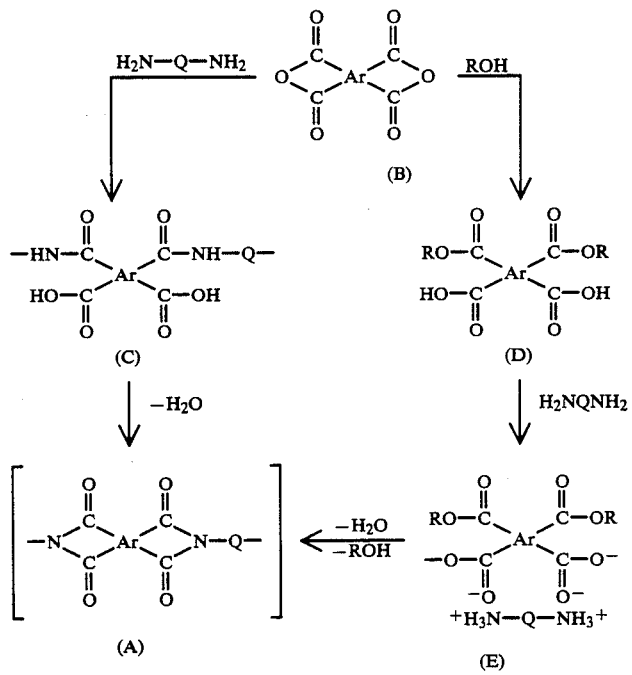

Thus, dianhydride (B) may be first converted by reaction with diamine $H_2NQNH_2$ into polyamide acid (C), which then can be chemically or thermally dehydrated to polyamide (A). Alternatively, dianhydride (B) may be first esterified with alcohol ROH, e.g., ethyl alcohol where $R=C_2H_5$, to diester diacid (D), which forms with diamine $H_2NQNH_2$ salt (E). This salt then is

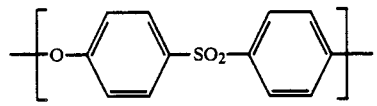

SUMMARY OF INVENTION

According to the present invention, there is now provided a class of polyimides having a lowered glass transition temperature (Tg), with high thermal stability as well as improved solvent resistance utilizing as the diamine component certain aromatic sulfones of the formula:

$$NH_2-Ar'-SO_2Ar'-NH_2$$

and aromatic fluoroaliphates of the formula:

$$NH_2-Ar''-C(CF_3)_2Ar''NH_2$$

where Ar'

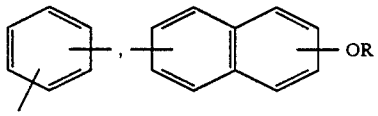

where $\mathcal{Z}'$ is a chemical bond, such as

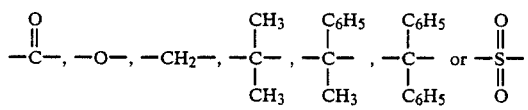

where Ar'' is

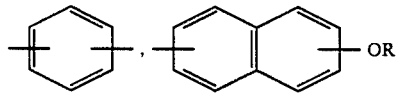

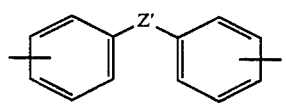

where $\mathcal{Z}'$ is the same or different than $\mathcal{Z}$ as previously defined and is a chemical bond,

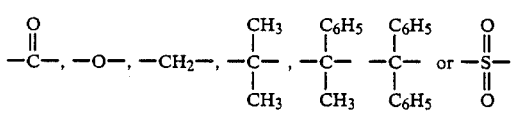

These diamines are reacted with suitable dianhydrides or dianhydride derivatives to provide copolyimides having sufficient amounts of sulfonyl groups so as to depress or destroy the crystallinity of the polymer thereby lowering the Tg and improving processing properties.

Further, there are provided copolyimide precursor compositions which can be additionally processed to give the same polyimides.

DETAILED DESCRIPTION OF THE PREFERRED EMBODIMENTS

All of the polyimides of the present invention can be prepared by the process illustrated in the earlier equations to prepare polymer (A). As such, polyimides having an aromatic backbone in addition to the 2-hexafluoroisopropylidene and sulfonyl groups are prepared by the routes illustrated.

As noted earlier, the dianhydrides or their derivatives are reacted with at least two different aromatic diamines. One such diamine is an aromatic sulfonyl one of the formula:

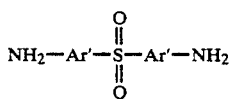

where Ar' is a divalent aromatic nucleus. Preferred Ar groups are

where $\mathcal{Z}$ is a chemical bond,

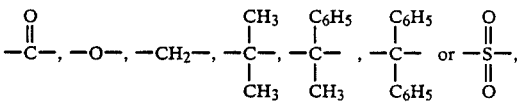

Preferably $\mathcal{Z}$ is a chemical bond,

—O— or —CH$_2$—.

Specific examples of these aromatic sulfonyl diamines for use in this invention are:

4,4'-diaminodiphenylsulfone; 3,3'-diaminodiphenylsulfone;

1,7'-diaminodinaphthylsulfone; 1,6'-diaminodinaphthylsulfone;

bis[4-(4-aminophenoxy)phenyl]sulfone;
bis[4-(3-aminophenoxy)phenyl]sulfone;
bis(4-aminobenzophenone)sulfone;
bis(3-aminobenzophenone)sulfone;
bis[2,2-(4-aminophenyl-4-phenyl)propane]sulfone; and the like.

The other diamine useful in preparing the copolymers of the present invention are those aromatic fluoroaliphatic ones of the formula

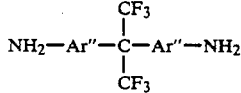

where Ar'' is

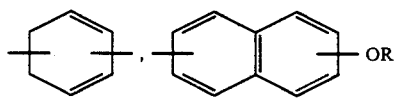

-continued

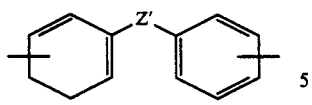

where Z' is a chemical bond, such as

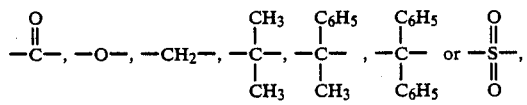

Preferably Z' is a chemical bond,

—O— or —CH₂—.

Specific examples of the aromatic fluoroaliphatic diamine are:

2,2-bis[4-(4-aminophenoxy)phenyl]hexafluoropropane (4-BDAF);
2,2-bis[4-(3-aminophenoxy)phenyl]hexafluoropropane (3-BDAF); and the like.

It should be noted that while the above disclosed aromatic sulfonyl diamines and aromatic fluoroaliphatic diamines are used to prepare the compositions of the present invention, further final property modification is possible by using one or more other aromatic diamine such as those of the formula:

NH₂—R—NH₂ where R is a divalent aromatic nucleus that may be the same or different from Ar' or Ar". In such cases terpolymers are formed.

As specific examples of other aromatic diamines conforming to the definition there may be mentioned: o-, m- and p-phenylenediamine; diaminotoluenes, such as 2,4-diaminotoluene; 1,4-diamino-2-methoxybenzene; 2,5-diaminoxylene; 1,3-diamino-4-chlorobenzene; 1,4-diamino-2,5-dichlorobenzene; 1,4-diamino-2-bromobenzene; 1,3-diamino-4-isopropylbenzene; N, N'-diphenyl-1,4-phenylenediamine; 4,4'-diaminodiphenyl-2,2-propane; 4,4'-diamino-diphenylmethane; 2,2'- or 4,4'-diaminostilbene; 4,4'-diamino-2,2',3,3', 5,5',6,6'-octafluorodiphenylmethane; 4,4'-diaminodiphenylether; 4,4'-diamino-2,2',3,3',5,5',6,6'-octafluorodiphenylether; 4,4'-diaminodiphenyl-thioether; 4,4'-diaminobenzoic acid phenyl ester; 2,2'- or 4,4'-diaminobenzophenone; 4,4'-diaminobenzil; 4-(4'-aminophenylcarbamoyl)aniline, bis-(4-aminophenyl)phosphine oxide; bis-(4-aminophenyl)methylphosphine oxide; bis-(3-aminophenyl)methylphosphine oxide; bis-(4-aminophenyl)phenylphosphine oxide; bis-(4-aminophenyl)cyclohexylphosphine oxide; N,N-bis-(4-aminophenyl)-N-phenylamine; N,N-bis-(4-aminophenyl)-N-methylamine; 2,2'-, 3,3'- or 4,4'-diaminoazobenzene; 4,4'-diaminodiphenylurea; 1,8- or 1,5-diaminonaphthalene; 1,5-diaminoanthraquinone; diaminofluoroanthene; 3,0-diaminochrysene; diaminopyrene; bis-(4-aminophenyl)diethylsilane; bis-(4-aminophenyl)dimethylsilane; and bis-(4-aminophenyl)tetramethyldisiloxane.

The polyimides of the present invention will contain randomly distributed at least one unit of formula:

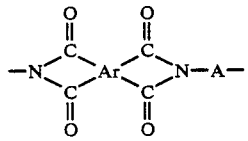

wherein -A- is the unit

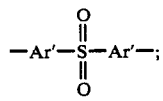

and at least one unit of the formula

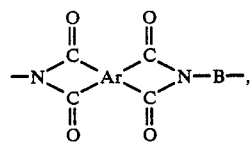

where -B- is the unit

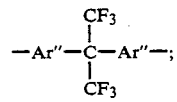

wherein Ar is a tetravalent aromatic radical and Ar' and Ar" are as previously defined.

Polyimide precursors, i.e. polyamic acids are also embodied in this invention. These materials contain at least one unit of the formula:

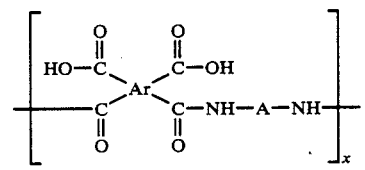

and at least one unit of the formula

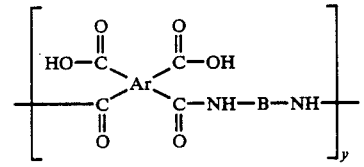

where x, y, Ar, A and B are defined above.

These polyimides are prepared by the reaction of a dianhydride or its ester derivative with a diamine. The dianhydride used in this invention can be represented by the formula:

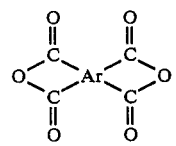

where Ar is the tetravalent residue of a tetracarboxylic acid.

In these dianhydrides Ar is a tetravalent radical selected from substituted and unsubstituted heterocyclic or aromatic groups and combinations thereof. Each pair of the carbonyl groups attached to such radical are ortho to each other.

Ar can be a tetravalent benzene or naphthalene nucleus illustrated by:

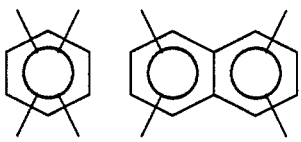

Ar can also be a tetravalent group of formula

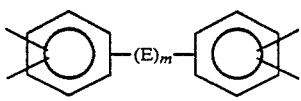

where m is 0 or 1 and E is —O—, —S—,

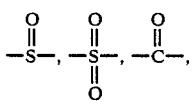

or —C$_n$H$_{2n}$— where n is an integer from 1 to 8. These compounds are illustrated by the following:

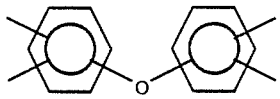

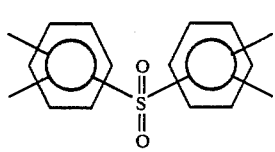

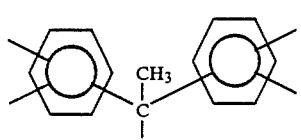

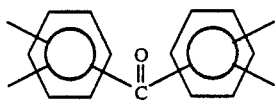

Ar can also be the tetravalent residue of formula

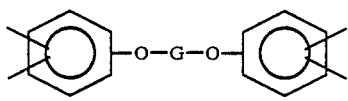

where G is phenylene or a group of formula

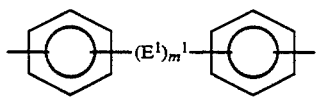

where m$^1$ is 0 or 1 and E$^1$ is the same or different than E defined above.

In this embodiment, Ar is illustrated by

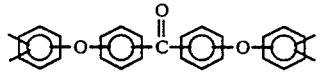

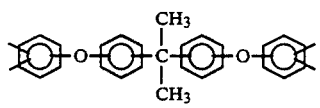

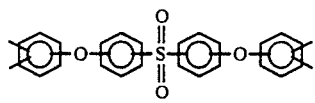

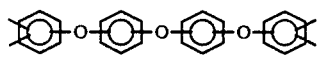

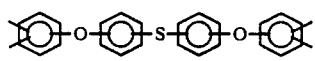

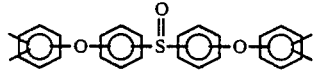

Similarly, the ether linkage can be replaced by —S—,

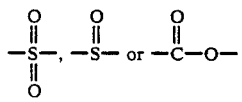

to provide useful dianhydrides.

The dianhydride component can be used alone or in combination with one or more other dianhydrides or ester derivatives.

The following may be mentioned as examples of suitable tetracarboxylic acid dianhydrides: pyromellitic acid dianhydride; 3',4,4'-benzophenonetetracarboxylic acid dianhydride; 2,3,3',4'-benzophenonetetracarboxylic acid dianhydride; 2,2',3,3'-benzophenonetetracarboxylic acid dianhydride; 4,4',5,5',6,6'-hexafluorobenzophenone-2,2',3,3'-tetracarboxylic acid dianhydride; 3,3',4,4'-diphenyl-tetracarboxylic acid dianhydride; 2,2',3,3'-diphenyl-tetracarboxylic acid dianhydride; bis-(2,3-dicarboxyphenyl)methane dianhydride; bis-(3,4-dicarboxyphenyl)methane dianhydride; bis-(2,5,6-trifluoro-3,4-dicarboxyphenyl)methane dianhydride; 1,1-bis-(3,4-dicarboxyphenyl)ethane dianhydride; 2,2-bis-(3,4-dicarboxyphenyl)propane dianhydride; 2,2-bis-(2,3-dicarboxyphenyl)propane dianhydride; 2,2-bis(3,4-dicarboxyphenyl)hexafluoropropane dianhydride; bis-(3,4-dicarboxyphenyl)ether dianhydride; bis-(2,3-dicarboxyphenyl)ether dianhydride; bis-(2,5,6-trifluoro-3,4-dicarboxyphenyl)ether dianhydride; bis-(3,4-dicarboxyphenyl)sulphone dianhydride; bis-(2,5,6-trifluoro-3,4-dicarboxyphenyl)sulphone dianhydride; bis-(3,4-dicarboxyphenyl)phenylphosphonate dianhydride; bis-(3,4-dicarboxyphenyl)phenylphosphine oxide dianhydride; N,N-(3,4-dicarboxyphenyl)-N-methylamine dianhydride; bis-(3,4-dicarboxyphenyl)diethylsilane dianhydride; bis-(3,4-dicarboxyphenyl)tetramethyldisiloxane dianhydride; 3,3',4,4'-tetracarboxybenzoyloxybenzene dianhydride; 1,4,5,8-naphthalenetetracarboxylic acid dianhydride; 2,3,6,7-naphthalene-tetracarboxylic acid dianhydride; 1,2,5,6-naphthalene-tetracarboxylic acid dianhydride; 2,6-dichloronaphthalene-1,4,5,8-tetracarboxylic acid dianhydride; 2,7-dichloronaphthalene-1,4,5,8-tetracarboxylic acid dianhydride; 2,3,6,7-tetrachloronaphthalene-1,4,5,8-tetracarboxylic acid dianhydride; 1,4,5,8-tetrafluoronaphthalene-2,3,6,7-tetracarboxylic acid dianhydride; phenanthrene-1,8,9,10-tetracarboxylic acid dianhydride; 3,4,9,10-perylenetetracarboxylic acid dianhydride; thiophene-2,3,4,5-tetracarboxylic acid dianhydride; pyrazine-2,3,5,6-tetracarboxylic acid dianhydride; pyridine-2,3,5,6-tetracarboxylic acid dianhydride; tetrahydrofurane-2,3,4,5-tetracarboxylic acid dianhydride; 3,3',4,4-azobezene-tetracarboxylic acid dianhydride; 3,3',4,4'-azoxybenzenetetracarboxylic acid dianhydride; and 1,2,3,4-cyclopentanetetracarboxylic acid dianhydride. These dianhydrides may be converted to the tetracarboxylic acids and to di or tetra aliphatic esters which may also be used to prepare the copolymers of the present invention.

Other suitable tetracarboxylic dianhydrides may be prepared by linking two moles of trimellitic dianhydride through their free acid group as described in U.S. Pat. Nos. 3,182,073 and 3,347,808. These dianhydrides are then converted to the partial or full ester derivatives through conventional methods.

The free tetracarboxylic acids used may be prepared by reacting the corresponding dianhydrides with water or other methods well known to those skilled in the art.

The ester derivatives of the foregoing tetracarboxylic acid anhydrides are readily prepared by reacting the corresponding dianhydride with an alcohol such as ethanol. By controlling the reaction conditions one may prepare partial or full ester derivatives of the type described above. Examples of other suitable alcohols in addition to ethanol mentioned above include methanol, and numerous isomeric forms of the followng alcohols propanol, butanol, pentanol, hexanol, heptanol, and octanol.

The tetracarboxylic acid esters used in the practice of this invention are available commercially or can be readily prepared by one skilled in the art according to the procedures set forth in U.S. Pat. No. 3,347,808 or standard reference texts such as Heilbron and Bunbury, "Dictionary of Organic Compounds." Frye and Spottiswood, London (1953), as Well as other references which are well known to those skilled in the art.

The reaction used to prepare the polyimides is usually carried out in a solvent. Suitable solvents have polar groups, such as alcohol, ether, ketone, amide, or sulfoxide. Preferred solvents are N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-ε-caprolactam, hexamethylphosphoric acid triamide (hexametapol), N,N,N',N'-tetramethylurea, tetrahydrothiophene dioxide (sulpholane), tetrahydrofuran and dimethylsulphoxide.

The reaction can also be carried out in mixtures of such solvents. On the other hand it is also possible to dilute these preferred solvent systems with other organic aprotic solvents, such as aromatic, cycloaliphatic or aliphatic, optionally chlorinated hydrocarbons, for example benzene, toluene, xylene, cyclohexane, pentane, hexane, petroleum ether, methylene chloride, tetrahydrofuran, cyclohexanone and dioxane.

After completion of the reaction the solvents can be removed in the usual manner if desired, for example by distillation, if appropriate under reduced pressure. Copolymers manufactured according to the invention can also be precipitated according to known methods by pouring the reaction solution into a non-solvent, such as water or aliphatic hydrocarbons, for example petroleum ether, but especially methanol, diethyl ether, diethers of monoethylene glycol, diethylene glycol or triethylene glycol, or acetonitrile and the like, and dried if desired.

In the first step of the reaction, a polyamic acid solution is typically produced. See reaction paths, compound (C). In the preferred method for forming the compositions of this invention, this solution is further heated, causing cyclization and polyimide formation. The cyclization of the polyamide acid polymers obtained according to the invention to give the corresponding poly(imide sulfone) is carried out in a manner which is in itself known, preferably by heating to temperatures between about 100° and 300° C., or by treatment with a dehydrating agent by itself or mixed with a tertiary amine; examples to be mentioned are acetic anhydride, propionic anhydride and dicyclohexylcarbodiimide or a mixture of acetic anhydride and triethylamine or pyridine.

In applications where these improved compositions are to be used as adhesives or coating materials, the polyamic acid solutions prepared as noted earlier can be used or formed from the reaction. For example, in a method of forming resin matrix composites, cloth such as glass or carbon fiber cloth (woven or non-woven) is impregnated with the polyamic acid precursor solution of this invention. Such impregnation can be conveniently carried out by dipping such cloth into a resin solution. Excess solution can be removed by passing the cloth through squeeze rolls. Solvent is removed in any convenient manner such as by heating the solution-impregnated cloth, e.g. in an oven at a temperature often above the boiling point of the solvent. The length of time at elevated temperature is preferably short, e.g. less than about 10 minutes, but will be sufficiently long to remove solvent and promote partial reaction of the resin to a coherent thermoplastic state providing a dry resin-impregnated cloth. Such resin-impregnated cloth can then be provided in one or more layers which can be formed, e.g. thermoformed, and cured to provide a thermoplastic resin matrix composite structure by heating for an extended period of time, e.g. about an hour or more, at elevated temperatures say between about 150° and 300° C., preferably at least about 180° C. to about 250° C.

Preferred polyimide precursors of this invention useful as coatings or for impregnating various substrates have the following composition:

| (1) | $\underset{\underset{O}{\overset{O}{\|}}}{\text{NH}_2\text{Ar}'\overset{\|}{\text{S}}}-\text{ArNH}_2 + \text{NH}_2\text{Ar}''-\underset{\underset{CF_3}{\overset{CF_3}{\|}}}{\overset{\|}{\text{C}}}-\text{Ar}''-\text{NH}_2$ | 25–50 wt % |
|---|---|---|
| (2) | Diester of aromatic tetracarboxylic acid | 25–40 wt % |
| (3) | Polyamic Acid of (1) and (2) | 2–20 wt % |
| (4) | Solvent | 15–25 wt % | provided of course that components (1) and (2) are present in substantially equimolar quantities, the resultant precursor has the desirable physical properties for a hot-melt prepreg. In this connection, by "substantially equimolar quantities" is meant that the molar ratio of the components is in the range of 0.9 up to 1.1 and preferably in the range of 1.0 up to 1.1.

The diamines are often prereacted with a few mole % of an end-capping agent (e.g. phthalic anhydride) to restrict the growth of polymer chains and reduce the melt viscosity of the polyimide products, thus making them easier to process into void-free composite parts.

It will be appreciated of course that the polyamic component will generally be of relatively low molecular weight, e.g., its weight average molecular weight will often fall in the range of about 1500 to 5000.

In the compositions of the present invention it is critical to have the amount of sulfonyl monomer in the diamine reactants less than 50% since physical properties are adversely affected by too high a sulfonyl content. Consequently the amine

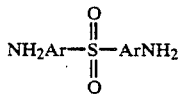

should be used with the amine

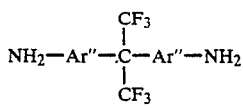

at 49 mole percent or less for the preparation of these polyimides. Concentrations of such amine at less than 1% however do not give rise to any improvement in processability. Preferred is a ratio of the two amines at about 10:90 to 40:60; most preferably about 20:80 to about 30:70 aromatic sulfone to aromatic fluoroaliphatic diamine.

In yet another aspect of this invention, these sulfonyl-containing copolymeric imides have been found to possess improved adhesion to a variety of substrates. In one embodiment of this aspect the polyimides are employed as wire coatings and as coatings for filaments of metal, glass and ceramic. In still another embodiment, the polyimides are used as primers or adhesion promoters between a substrate, such as glass, metal and ceramic, and a matrix such as epoxy, polyester, phenol and rubber.

The following disclosure is provided to illustrate specific embodiments and aspects of the invention but does not imply any limitation of the scope of the invention.

EXAMPLE 1

A solution was prepared by dissolving 2,2-bis[4-(4-aminophenoxy)phenyl]hexafluoropropane (4-BDAF) (125 g; 0.2415 mole) with N-methylpyrrolidone (500 g) at 25° C. Phthalic anhydride (PA) (0.44 g; 0.003 mole) was stirred in at 25° C. Reaction was complete within 20 minutes. 3,'3-diaminodiphenyl sulfone (3,3'-DDS) (14.9 g; 0.060 mole) was added to give a clear amber liquid (A).

Pyromellitic dianhydride (PMDA) (65.4 g; 0.300 mole) was dissolved in NMP (500 g) with gentle warming to give a clear pink solution (B).

A clean five-liter stainless steel autoclave was assembled with a wide spiral stirrer and several other fittings (thermocouple, nitrogen pressure inert, a rupture disc fitting). Xylenes (1500 g) were charged to this reactor followed by solutions (A) and (B). Another 1000 g of xylenes were used to rinse in these solutions.

The autoclave was sealed and stirred at 200 rpm for 5 hours. The mixture was heated to about 165° C. over a two hour period by applying heat (the autoclave was jacketed and was heated with 170° C. oil which was circulated through this jacket). After three hours at 165° C. the heating was discontinued and the mass allowed to cool (with stirring) overnight.

The thick green slurry was discharged from the reactor and stirred with four liters of ethyl acetate at 25° C. for 30 minutes.

The solids were filtered off using a Buchner funnel. The voluminous precipitate was reslurried and filtered (from another four liters of ethyl acetate) and finally reslurried in four liters of cyclohexane and filtered.

After drying on the filter for an hour the solids were broken up into a powder and ground using a pestle and mortar. After sieving to less than 500 microns the product was finally dried in a vacuum oven at 230° C. at less than 0.5 mm Hg pressure for several hours. About 180 g of product were obtained.

EXAMPLE 2

(Comparative)

The procedure illustrated in Example 1 was repeated but no co-diamine was added to the 4-BDAF. 188g of polyimide powder was collected from this preparation.

EXAMPLE 3

A third preparation was carried out in which 4,4'-diaminodiphenyl sulfone (4,4'-DDS) was used with 4-BDAF. The autoclave charge in this experiment was as follows:

(a) a solution made by dissolving 125.1 g of 4-BDAF and 0.44 g PA in 500 g NMP and then subsequently dissolving 14.9 g (b) a solution of 65.4 g PMDA in 500 g NMP.

(c) 2500 g xylenes.

150 g of polyimide powder was obtained in this experiment.

EXAMPLE 4

Example 3 was repeated but the 4,4'-DDS was first reacted with PMDA by heating a solution of 65.4 g PMDA in 500 g NMP with a solution of 14.9 g 4,4'-DDS in 100 g NMP for one hour at 115° C. This product was subsequently mixed with a solution of 4-BDAF (125.1 g) and PA (0.44 g) in 400 g NMP, and imidized as shown in Example 1. 136 g of polyimide powder were obtained after work-up.

EXAMPLE 5

Compositions suited to the preparation of hot-melt prepregs can be made by the general procedure described in this example:

PMDA (218.1 g/ 1.0 mole) and methanol (64.1 g; 2 moles) are heated to 70° C. for 1-2 hours to yield the dimethyl esters of PMDA in quantitative yield. NMP (250 g) is used as solvent. A solution of 4-BDAF (414 g; 0.8 mole and 3,3'-DDS( 49.7 g; 0.20 mole) in THF (500 g) is added and the mixture heated to 80° C. for 2-3 hours. THF is then slowly removed under very slight vacuum at 70°-80° C. over a period of about 2 hours.

Several ounces of the molten precursor solution were spread into a film on strips of release paper at about 60° to 70° C. On cooling the resinous film remained supple and the coated paper could be bent sharply without breaking the coating. Consequently, it could be easily stored in this form by rolling the coated paper into conveniently sized rolls as is the practice in pseudo hot-melt processing.

A piece of woven carbon fiber cloth was placed on top of a piece of the coated paper and then covered with another piece of release paper. The sandwich-like product was warmed to 60° to 70° C. on a hot plate and pressure applied to help the melted coating to flow for a few seconds. On cooling, the paper was peeled from the now fully impregnated carbon fiber cloth. Virtually all of the coating had been transferred from the paper to the cloth—another requirement in the hot-melt process. The product contained 47 wt % resin and 53% fibers.

The resulting carbon fiber prepreg had good tack and drape and was stored on paper backing. Storage tests at 0° C. and 25° C. show that the prepreg retains its tack and drape for two weeks with little or no change in its chemical composition.

We claim:

1. A polyamide resin composition comprising randomly distributed units of the formula

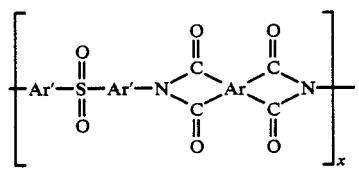

and

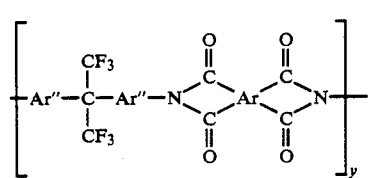

wherein Ar' is

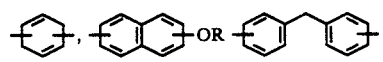

where $Z$ is a chemical bond

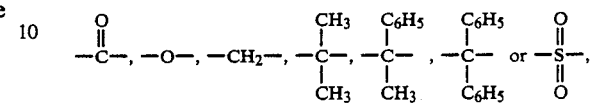

Ar" is

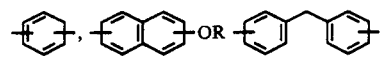

where $Z'$ is the same or different than Z as previously defined and is a chemical bond,

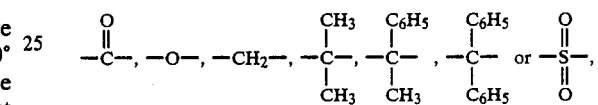

Ar is the tetravalent residue of a tetracarboxylic acid, or acid dianhydride, or di or tetraester thereof and the mole ratio of x:y is from about 1:99 to about 49:51.

2. The composition of claim 1 wherein Z and Z' are the same or different and are a chemical bond,

—O— or —CH$_2$—.

3. The composition according to claim 2 wherein Ar is

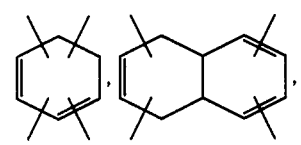

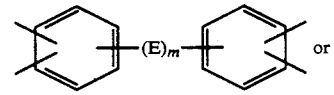

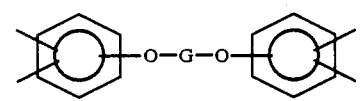

where m is 0 or 1 and E is

—O—, —S—, $-\overset{O}{\underset{}{S}}-$, $-\overset{O}{\underset{O}{S}}-$, $-\overset{O}{\underset{}{C}}-$ or $C_nH_{2n}$ and G is phenylene or

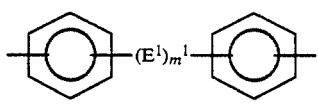

where $m^1$ is 0 or 1 and $E^1$ is the same as E as previously defined.

4. The composition of claim 3 wherein Ar is

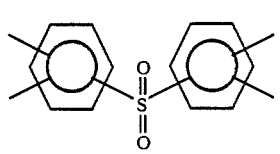

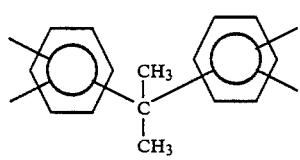

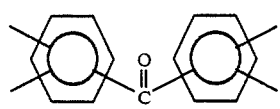

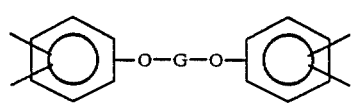

where G is phenylene or

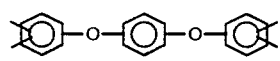

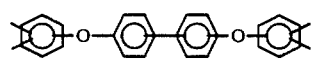

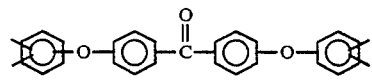

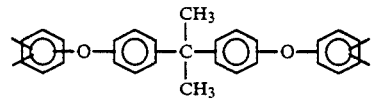

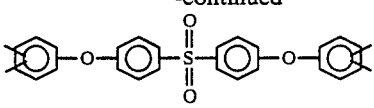

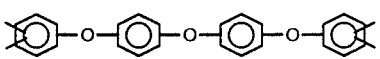

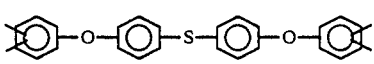

5. A polyamide resin composition prepared by the process comprising treating substantially equimolar amounts of aromatic sulfonyl diamines of the formula $$NH_2-Ar'-\overset{O}{\underset{O}{\overset{\|}{S}}}-Ar'-NH_2$$

where Ar' is

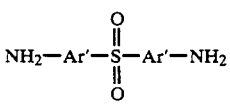

where Z is a chemical bond,

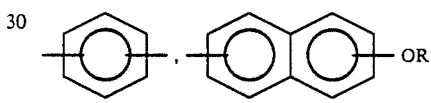

and a aromatic fluoroaliphatic diamine of the formula $$NH_2-Ar''-\overset{CF_3}{\underset{CF_3}{\overset{|}{C}}}-Ar''-NH_2$$

where Ar" is

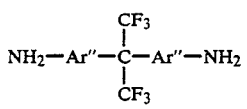

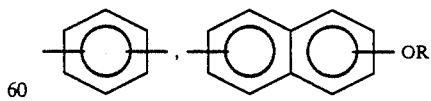

where Z' is the same or different than Z as previously defined and is a chemical bond,

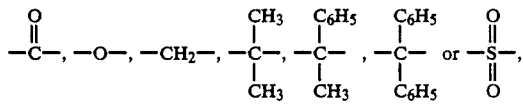

with an aromatic carboxylic acid dianhydride or di ester or tetraester derivative thereof of the formula

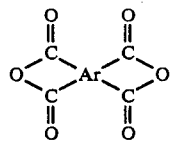

where Ar is a tetravalent residue of said aromatic carboxylic dianhydride or di or tetraester thereof forming said polyimide composition having at least one unit of the formula

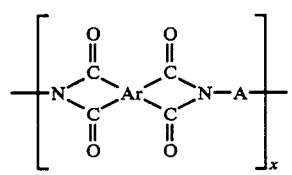

and at least one unit of the formula

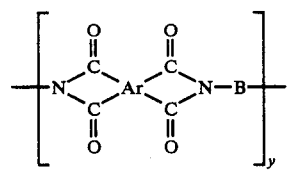

where —A— is

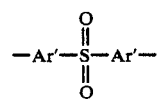

and B is

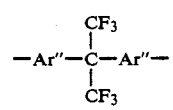

wherein Ar, Ar' and Ar" are as previously defined where the ratio of x:y is from about 1:99 to about 49:51.

6. The composition of claim 5 wherein Z and Z' are the same or different and are a chemical bond,

—O— or —CH$_2$—

7. The composition according to claim 6 wherein Ar is

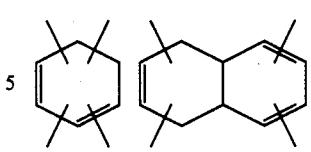

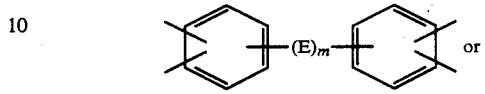

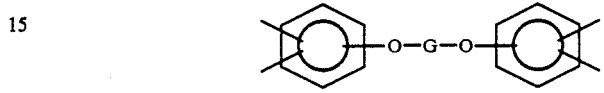

where m is 0 or 1 and E is —O—, —S—,

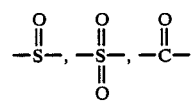

or C$_n$H$_{2n}$
and G is phenylene or

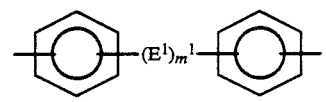

where m$^1$ is 0 or 1 and E$^1$ is the same as E as previously defined.

8. The composition of claim 7 wherein Ar is

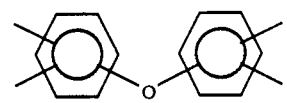

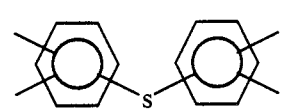

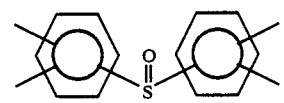

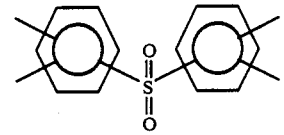

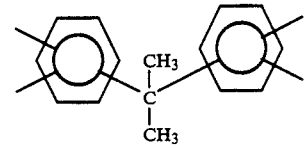

-continued

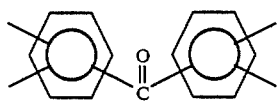

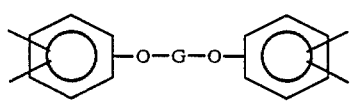

where G is phenylene or

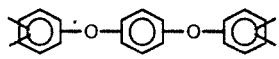

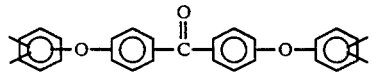

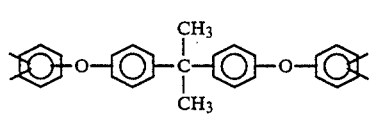

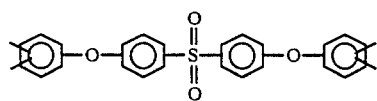

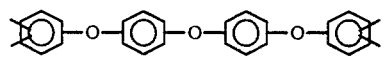

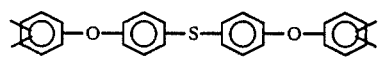

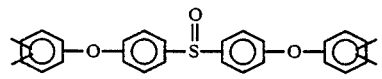

9. The composition of claim 8 wherein said aromatic sulfonyl diamines are 4,4,'-diaminodiphenylsulfone; 3,3,'-diaminodiphenylsulfone; 1,7-diaminonaphthylsulfone; 1,6-diaminonaphthylsulfone; bis[4-(4-aminophenoxy)phenyl]sulfone; bis[4-(3-aminophenoxy)phenyl]sulfone; bis[4-(3-aminophenoxy)phenyl]sulfone; bis(4-aminobenzophenone)sulfone; bis(3-aminobenzophenone)sulfone; bis[2,2-(4-aminophenyl-4-phenyl)-propane]sulfone; and the like.

10. The composition of claim 9 wherein said aromatic fluoroaliphatic diamines are 2,2-bis[4-(4-aminophenoxy)phenyl)]hexafluoropropane (4-BDAF); 2,2-bis[4-(3-aminophenoxy)phenyl]hexafluoropropane (3-BDAF); and the like.

11. The composition of claim 10 wherein the ratio of said aromatic sulfonyl diamine to said aromatic fluoroaliphatic diamine is about 20:90 to about 30:70.

12. A hot-melt prepreg composition comprising
(i) a polyamic acid comprising randomly distributed units of the formula

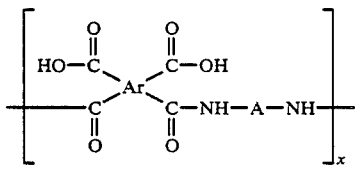

and

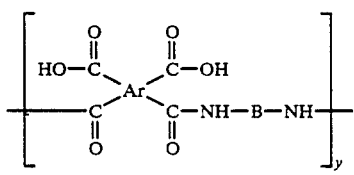

where Ar is a tetravalent residue of a tetracarboxylic acid, Ar' is

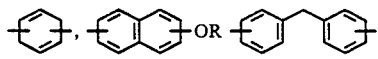

Ar" is

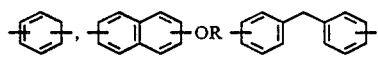

and the mole ratio of x:y is from about 1:99 to about 49:51;
(ii) a diester of an aromatic tetracarboxylic acid;
(iii) an aromatic sulfonyl diamine of the formula

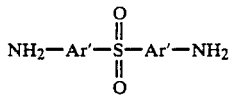

(iv) an aromatic fluoroaliphatic diamine of the formula

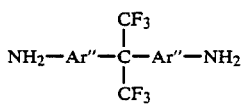

wherein Ar' and Ar" are as previously defined with the proviso that the quantity of component (ii) is not substantially different from components (ii) and (iii).
(v) a solvent.

* * * * *

UNITED STATES PATENT AND TRADEMARK OFFICE
CERTIFICATE OF CORRECTION

PATENT NO. : 4,963,649
DATED : October 16, 1990
INVENTOR(S) : William E. Wright, et al.

It is certified that error appears in the above-identified patent and that said Letters Patent is hereby corrected as shown below:

Abstract of the Disclosure, third formula, Z is omitted. Formula should read:

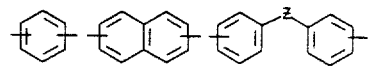

Column 14, line 5, Z omitted. Formula should read:

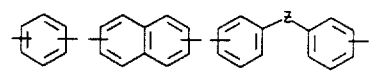

Column 14, line 17, Z is omitted. Formula should read:

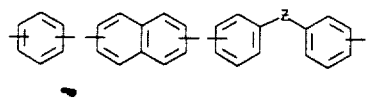

UNITED STATES PATENT AND TRADEMARK OFFICE
CERTIFICATE OF CORRECTION

PATENT NO. : 4,963,649

DATED : October 16, 1990

INVENTOR(S) : William E. Wright, et al.

It is certified that error appears in the above-identified patent and that said Letters Patent is hereby corrected as shown below:

Column 19, line 52, "bis[4-(3-aminophenoxy)-phenyl]sulfone" is repeated.

Column 20, claim 12, 20, line 29, $Z$ is omitted. Formula should read:

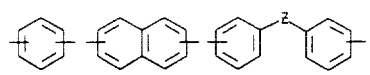

Column 20, claim 12, line 32, $Z$ is omitted. Formula should read:

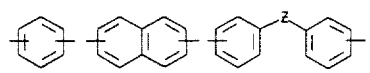

Signed and Sealed this

Twenty-first Day of July, 1992

Attest:

DOUGLAS B. COMER

Attesting Officer        Acting Commissioner of Patents and Trademarks